Sept. 5, 1961 J. GEISSLER 2,998,865
LUBRICATING DEVICE
Filed March 16, 1959 5 Sheets-Sheet 1

INVENTOR
Joachim GEISSLER

Sept. 5, 1961   J. GEISSLER   2,998,865
LUBRICATING DEVICE
Filed March 16, 1959   5 Sheets-Sheet 2

INVENTOR
Joachim GEISSLER

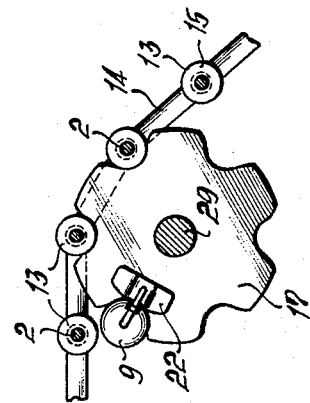
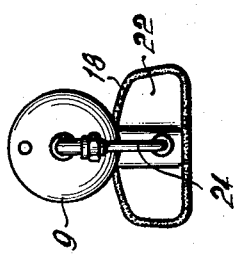
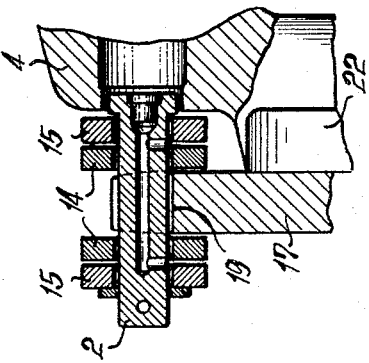
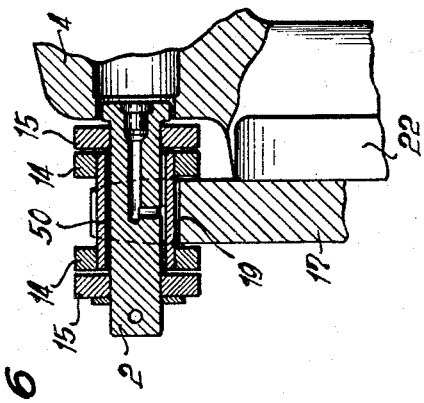

Sept. 5, 1961  J. GEISSLER  2,998,865
LUBRICATING DEVICE
Filed March 16, 1959  5 Sheets-Sheet 4

INVENTOR
Joachim Geissler

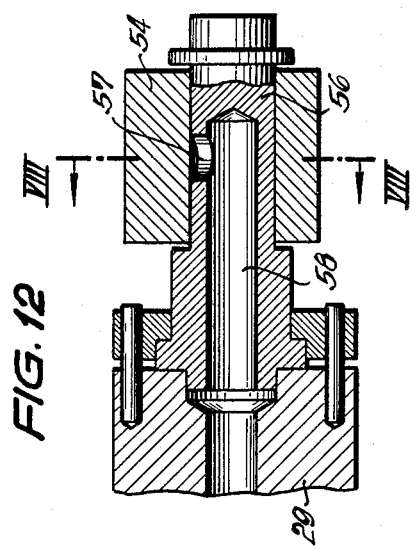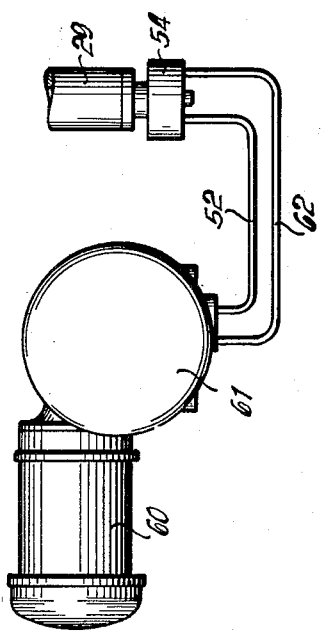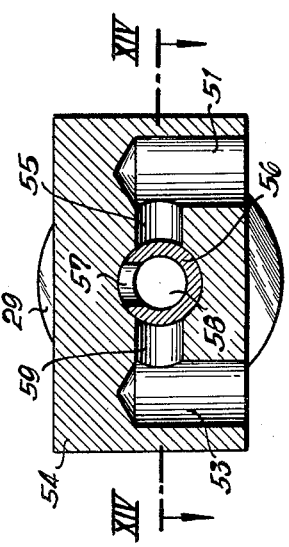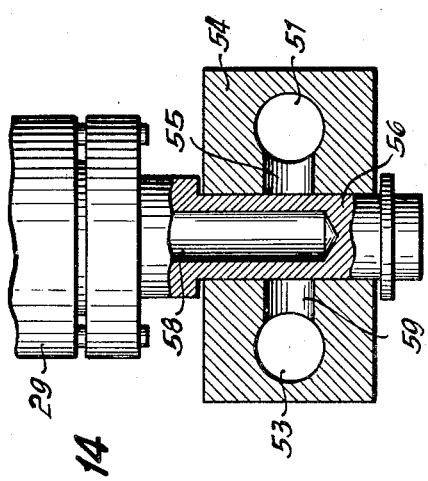

United States Patent Office

2,998,865
Patented Sept. 5, 1961

2,998,865
LUBRICATING DEVICE
Joachim Geissler, Koln-Nippes, Germany, assignor to De Limon Fluhme & Co., Dusseldorf, Germany
Filed Mar. 16, 1959, Ser. No. 799,701
Claims priority, application Germany Mar. 20, 1958
14 Claims. (Cl. 184—15)

The invention relates to a lubricating device for chain studs, bushings, rollers, chain links, etc., in which the lubricating head is equipped with a control piston which latter, when occupying its rest position, interrupts the lubricating passage in the lubricating head.

Lubricating devices of the above mentioned type are known. However, they have the drawback that they are relatively bulky and require so much space that they cannot be employed at all in many instances. One of the heretofore known devices of the type involved consists of a holder carrying the lubricating head and mounted on the same shaft on which also the deviating or looping sprocket is mounted. The lubricating head takes up considerable space and is arranged between said sprocket or the like and a cam disc fixedly connected to the machine bed or the like. The said holder moves the lubricating head along the cam disc when the holder for the lubricating head mounted on the same shaft as said sprocket rotates together with said sprocket. The lubricating head is controlled by the cam area of the cam disc. This heretofore known design is so bulky that already completed conveyor installations can in most instances not be equipped with such design. Moreover, this known design is relatively extremely heavy so that also for this reason its application is excluded in many instances.

It is, therefore, an object of the present invention to provide a lubricating device for chain studs, bushings, rollers, chain links, and the like, which will overcome the above mentioned drawbacks.

It is another object of this invention to provide a lubricating device of the type set forth in the preceding paragraph, which will require only little space and is relatively light so that it will also be possible without difficulties to install the same in already completed older conveying installations.

These and other objects and advantages of the invention will appear more clearly from the following specification in connection with the accompanying drawings, in which:

FIG. 5 is a section through a chain portion which rests in the tooth space by means of a chain stud.

FIG. 6 is a section through a chain portion which rests in the tooth space by means of a bushing.

FIG. 7 shows a sprocket having a lubricating device connected thereto by means of a connecting flange for a lubricating head.

FIG. 8 is a view of a lubricating head having its connecting flange welded to the deviating sprocket.

FIG. 11 is a diagrammatic view of a lubricant supply system.

FIG. 12 is a longitudinal section of a three-way cock, used in the supply system.

FIG. 13 is a cross section of the three-way cock substantially on line XIII—XIII of FIG. 12.

FIG. 14 is a section substantially on the line XIV—XIV of FIG. 13.

General arrangement

Figure 1:
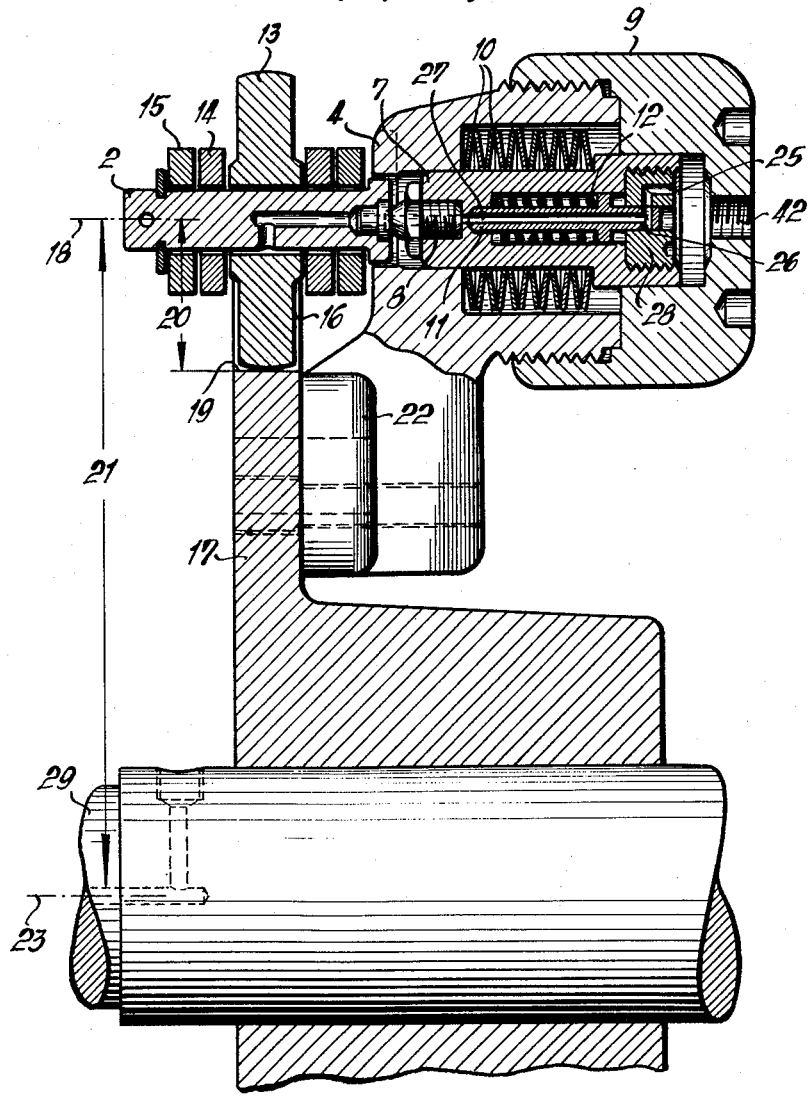
FIG. 1 is a vertical section through a deviating or looping sprocket and the lubricating device arranged adjacent thereto.

The lubricating device according to the present invention is characterized primarily in that the lubricating piston is controlled in conformity with the lubricant passing into the lubricating head and acting as control means. In this way, it will not be necessary to provide a control disc in the path of movement of the lubricating head.

The lubricating device according to the present invention has proved to operate in a very favorable manner. This is due to the fact that spring forces and the lubricant acting as control means act upon the lubricating piston and the control piston of the lubricating head in such a way that when the pressure of the lubricant exceeds a certain value, the lubricant advances not only the control piston but also the lubricating piston in the direction toward the lubricating nipple of the chain stud. This is done in such a way that the movement of the lubricating piston will be faster than the movement of the control piston so that the control piston adapted to interrupt the lubricating passage will release the latter only when the mouth piece of the lubricating piston is firmly pressed against the lubricating nipple of the chain stud.

The compactness of the device according to the present invention, which is arranged on a deviating or looping sprocket or the like, is furthermore aided when the lubricating head is connected near the bottom of a tooth space, which receives the roller, link, stud, or the like, to be lubricated, in such a way that the deviating or looping sprocket or the like carries the lubricating head whose lubricating piston axis is spaced from the bottom portion of the tooth space in radial direction so that said radial distance is less than the radius of the pitch diameter.

Structural arrangement

Referring now to the drawing in detail, the lubricating head illustrated therein comprises a housing 4 and a cap screw or box unit 9 threadedly engaging housing 4. With the arrangement according to FIG. 1, the lubricating head is equipped with a control piston 11. The control piston 11 is axially movable from a rest or neutral position into a working position and vice versa. When the piston 11 occupies its rest position, it interrupts the lubricating passage provided in the lubricating head 4, 9. In the said rest position, the lubricant which has entered the lubricating head through bore 42 and engages the lubricating piston 7, acts upon the control piston 11 in such a way that when the pressure of the lubricant exceeds a certain magnitude, both pistons namely lubricating piston 7 and control piston 11 will against the thrust of springs 10 and 12 be displaced in the direction toward the lubricating nipple of the chain stud 2. The effective area of lubricating piston 7 acted upon by lubricant under pressure and the thrust of spring 10 on one hand, and the effective area of control piston 11 acted upon by lubricant under pressure and the thrust of spring 12 on the other hand are such that during the said operation, the lubricating piston will be moved faster than control piston 11 to such an extent as to interrupt the lubricating passage 25, 26 and 27, and said lubricating passage will open only after the mouth piece of the lubricating piston 7 has been pressed firmly against the lubricating nipple of the chain stud 2 or the like. In this manner, the lubricating piston will first be seated in the stud 2 and then the control piston will be moved by pressure of the lubricant to open the passage 25, 26, so that lubricant may pass through passage 27 and nipple 8 to the passage in the stud 2.

With the arrangement shown in FIG. 1, lubricating head 4, 9 is connected near the bottom portion 19 of a tooth space 16 which has received the roller 13, link 14, 15 and chain stud or the like 2 in such a manner that the sprocket 17 will carry the lubricating head 4, 9. The lubricating piston axis 18 of the lubricating head 4, 9 is spaced from the bottom portion of the respective tooth space pertaining thereto by a radial distance 20 which is less than the pitch radius 21.

In conformity with the present invention, the connecting point between connecting flange 22 for the lubricating head and sprocket 17 or the like or the connecting element such as a connecting bolt 5, welding seam or the like which connects said flange 22 with sprocket 17 and when looking in radial direction is most remote from the axis of rotation 23 of sprocket 17, will be located close to or adjacent to the tooth space bottom portion 19 which is to receive the stud or the like 2 to be lubricated.

Figure 9:
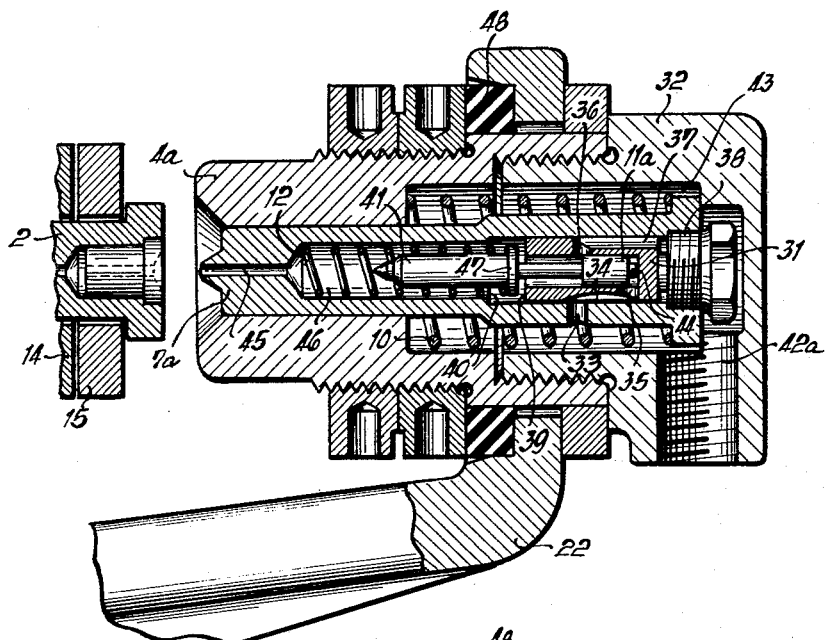
FIG. 9 shows a section through a lubricating head equipped with a lubricant metering device, said lubricating head occupying its rest position.
Figure 10:
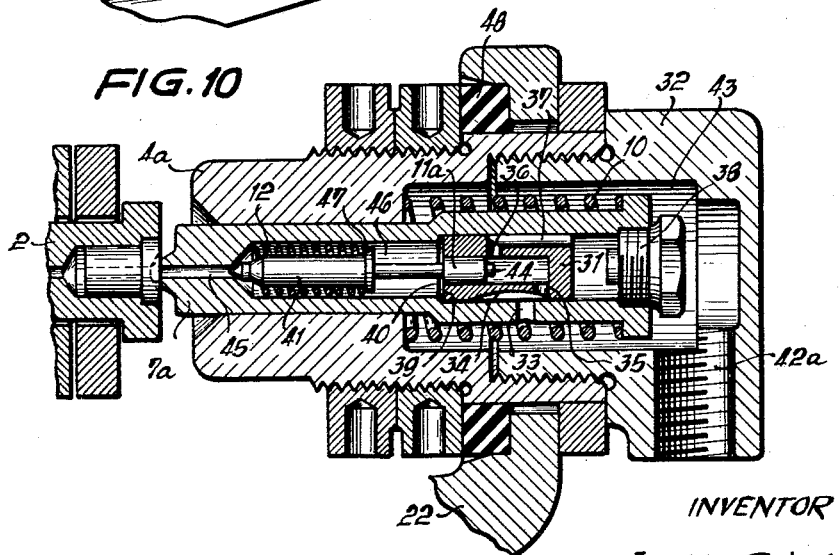
FIG. 10 shows the arrangement of FIG. 9 in working position.

With the lubricating head shown in FIG. 9, the lubricating piston 7a and control piston 11a thereof form parts of a lubricant metering device built into the lubricating head. Similar to the lubricating head of the lubricating device shown in FIGS. 1 to 8, also the lubricating head of FIG. 9 is provided with a housing 4a having slidably journalled therein a lubricating piston 7a. Likewise similar to the arrangement of FIG. 1, also with the arrangement of FIG. 9, a spring or spring group 10 is arranged in the housing 4a, said spring or spring group resting on one hand against housing 4a and on the other hand against lubricating piston 7a. The lubricating head shown in FIG. 9 is, similar to the lubricating head of FIG. 1, equipped with a control piston spring 12. However, the arrangement of FIG. 9 differs from that of FIG. 1 in that it comprises an additional feeding piston 31 in which the control piston 11a is slidably journalled while said feeding piston 31 in its turn is slidably longitudinally journalled in lubricating piston 7a.

Similar to the nut 9 closing the housing 4 of the lubricating head shown in FIG. 1, the arrangement of FIG. 9 is provided with a bolt 32 for the purpose of closing housing 4a and securing the pistons slidably arranged in housing 4a. Bolt 32 is screwed into the housing 4a and similar to nut 9 is provided with a passage or bore 42a through which the lubricant acting as control means is adapted to enter the lubricating head and to act upon the end face of lubricating piston 7a. If now a control valve, not shown in the drawing, is so arranged that the lubricant entering the housing 4a is under a pressure of the pump which exceeds the thrust of spring 10, the lubricant acting upon the end face of the lubricating piston 7a advances piston 7a in the direction of the lubricating nipple of chain stud 2 against the thrust of spring 10. In this connection, the mouth of piston 7a will engage the lubricating nipple of chain stud 2 or the like and will be firmly pressed against said lubricating nipple.

The lubricant entering the housing of the lubricating head under pressure does not merely act upon the end face of the lubricating piston 7a but also passes through passages, recesses or the like between piston 7a and bolt 32 and enters the cylindrical chamber 43 between lubricating piston 7a and housing 4a, said cylindrical chamber 43 enclosing spring 10 having one end in engagement with the lubricating piston 7a. When the lubricating piston 7a occupies the position shown in FIG. 9, the lubricant passes from chamber 43 through a bore 33 extending through piston 7a into a recess 34 of the feeding piston 31. Recess 34 is, by means of a passage 35, connected with the hollow chamber of feeding piston 31 in such a way that the lubricant passing from recess 34 through passage 35 into the hollow chamber of feeding piston 31 flows to the end 44 of the control piston 11a, said end being reduced in cross section and resting against the inner end face or bottom surface or the like of feeding piston 31. The end 44 of control piston 11a forms a stud which, in FIG. 9 position of control piston 11a engages the inner end face or bottom surface of feeding piston 31 where the reduced end 44 of control piston 11a meets that portion of the control piston 11a which has an outer diameter corresponding to the cross section of the hollow chamber of feeding piston 31, the control piston 11a being provided with an annular end face. When the lubricating pressure has reached a certain value, the lubricant acting upon said annular end face presses control piston 11a against the thrust of spring 12 in the direction toward the lubricating nipple. As soon as the stud 44 of control piston 11a disengages the bottom surface of the hollow chamber of feeding piston 31, the lubricant also passes behind the end face of the stud 44 of control piston 11a. When control piston 11a has been moved forward in the direction toward the lubricating nipple to such an extent that the control piston 11a has passed by bore 36 extending through the wall of the feeding piston, and has uncovered said bore, the relative movement of the control piston 11a with regard to the feeding piston 31 ceases, and the lubricant can now pass through bore 36 into a groove 37 of feeding piston 31. From here the lubricant passes behind the end face of feeding piston 31. First the lubricant passes only behind a portion of the end face of feeding piston 31 inasmuch as the latter, when in FIG. 9 position has the other portion of its end face in engagement with the adjusting or abutment screw 38. The farther the adjusting screw 38 has been screwed into the housing 4 of the lubricating head, the less will be the stroke which the feeding piston 31 can carry out, and the less will be the quantity of lubricant conveyed by the lubricating head and its metering device to the lubricating nipple of the chain stud 2.

Feeding piston 31 is moved by the lubricant in the direction toward the lubricating nipple and the increasing chamber between the end face of the feeding piston 31 and the abutment screw 38 will be filled with lubricant until the surface 39 of feeding piston 31 engages the surface 40 of lubricating piston 7a pressed against the lubricating nipple of the chain stud 2 or the like.

The lubricant passing through bore 33 of lubricating piston 7a, recess 34 and passage 35 of the feeding piston 31 and acting upon control piston 11a advances the latter against the thrust of spring 12 for the control piston further in the direction toward the lubricating nipple of chain stud 2 until bolt 41 connected to control piston 11a closes the lubricating passage 45 of piston 7a. As long as the feeding piston 31 and control piston 11a are advanced by the lubricant, the lubricant in hollow chamber 46 of piston 7a will, due to the advancing feeding piston 31 and control piston 11a, be pressed out of lubricating passage 45 to the lubricating nipple of chain stud 2.

If by a corresponding movement of a control slide or valve (not shown in the drawings), or in any other known manner, the lubricant in the lubricating head is relieved of the pressure produced by the lubricating feeding pump, spring 12 will move control piston 11a in the direction toward the adjusting screw 38. During the first part of this operation, feeding piston 31 will not be displaced. Only when stud 44 of control piston 11a engages the bottom surface or the like of feeding piston 31, control piston 11a will move feeding piston 31 through the intervention of spring 12, and both pistons 11a and 31 will return into their FIG. 9 position representing the starting position. Spring 10 returns lubricating piston to its starting position at a lower rate than spring 12 returns feeding piston 31 to its starting position. When the feeding piston 31 during its return movement to its starting position reduces the volume of the chamber between the end face of the feeding piston and the adjusting screw 38, the lubricant displaced from this chamber passes through groove 37 and bore 36 in front of the control piston 11a. Inasmuch as control piston 11a prevents this lubricant from returning through passage 35, the lubricant passes around the collar 47 of the control piston into the portion 46 of the hollow chamber of the lubricating piston, said hollow chamber housing the control piston spring 12. Thus, in conformity with the adjustment of the adjusting screw 38 a certain lubricating quantity is metered which during the next working stroke of the feeding piston 31 and of control piston 11a will be conveyed to the lubricating nipple of the chain stud 2.

The lubricating head is, by means of an elastic centering body 48, connected to the connecting flange 22 in such a way that the lubricating head will be able to center itself with regard to the lubricating nipple of the chain stud 2 to be lubricated.

Figure 2:
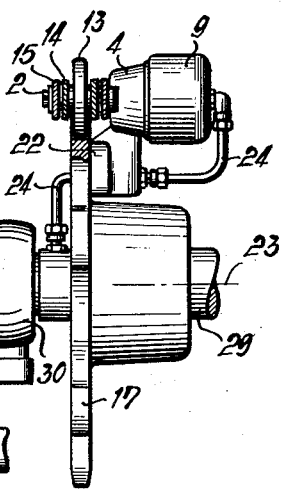
FIG. 2 shows a side view of the lubricating device of FIG. 1 but on a smaller scale than the latter.

FIG. 2 shows the lubricating device 9 connected by means of a pipe 24 and a hose 3 to a lubricating pump. The hose 3 is so connected to shaft 29 carrying sprocket 17 or to bearing 30 that the lubricant conveyed by hose 3 into shaft 29 can be conveyed to the lubricant head 4, 9 rotating together with sprocket 17 about the shaft axis 23. Pipe 24 is connected to the supply line for the lubricant in the interior of shaft 29 and also to the lubricating head 4, 9.

Figure 3:
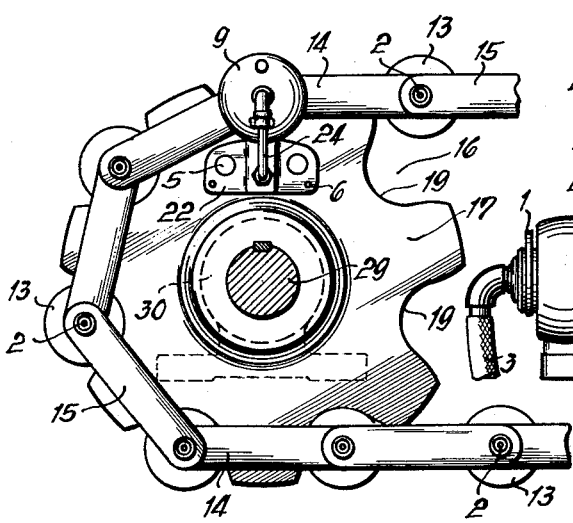
FIG. 3 is a side view of the deviating or looping sprocket and the lubricating head.
Figure 4:
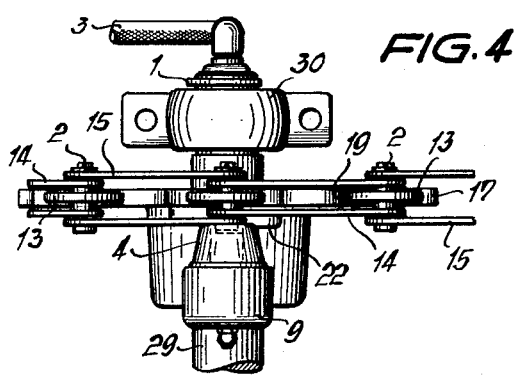
FIG. 4 is a top view of the structure shown in FIG. 3.

FIG. 3 shows a view of the sprocket 17 and the lubricating head 4, 9 connected thereto and also of the roller chain 13, 14, 15 carried by the sprocket 17. According to FIG. 3, the connecting flange 22 for the lubricating head is by means of bolts 5 connected to sprocket 17 near a tooth space bottom portion 19 so that when loosening the bolts 5, the flange 22 may be adjusted by adjusting pin 6 in any required manner. A top view of the sprocket 17 and lubricating head 4, 9 with chain 13, 14, 15 of FIG. 3 is shown in FIG. 4.

As will be seen from FIG. 5, the chain stud 2 comprises an axially extending lubricating passage from which branch off other lubricating passages so that by means of the axially extending lubricating passage and its branches, lubricant can be conveyed to the inner chain links 14 and outer chain links 15 carried by the chain stud 2. Stud 2 is arranged with regard to lubricating head 4, 9 in such a way that the latter can convey lubricant into the axially extending lubricating passage of chain stud 2. In contrast to the arrangement of FIG. 5, the chain shown in FIG. 6 rests in a tooth space 19 by means of a bushing 50. The lubricant conveyed from lubricating head 4, 9 to the lubricating passage in axial direction of chain stud 2 is conveyed from said axially extending lubricating passage and through said branch passages to the chain bushing. According to the arrangement of FIG. 7, the lubricating head 9 lubricates the roller 13, its stud 2 and the like during the time in which the roller 13 or stud 2 or the like engages the tooth space 19 associated with the lubricating head 9. According to FIG. 8, the connecting flange 22 of the lubricating head is welded to the sprocket near the tooth space associated with the lubricating head. The welding seam is indicated by the reference numeral 18.

It is, of course, to be understood that the present invention is, by no means, limited to the particular constructions shown in the drawings but also comprises any modifications within the scope of the appended claims.

The lubricant supply system is shown in FIGS. 11 to 14, the supply being connected to the hollow shaft 29 for feed to supply line 24, as seen in FIG. 2.

The pump 61 driven by motor 60 forces lubricant through line 62 to passages 51 and 55 of cock 54 to the plug valve 56. When port 57 of valve 56 is in communication with passage 55, lubricant is fed through bore 58 and shaft 29 and line 24 to the inlet 42 or 42a (FIG. 1 or 9). As the plug 56 is coupled for rotation with shaft 29, lubricant is supplied to the lubricating head at one position of the shaft 29 during each cycle.

Upon further rotation, the port 57 connects the bore 58 through passages 53 and 59 to return line 52 to pump 61, thereby removing pressure from the lubricating head, and allowing restoration of the lubricating pistons to normal position.

What I claim is:

1. In a lubricating head for lubricating an element of a chain drive: a lubricating piston reciprocably mounted in said lubricating head and movable from an ineffective position into an effective position for engagement with the element to be lubricated, conduit means extending through said lubricating piston for conveying lubricant therethrough to the element to be lubricated, fluid pressure operable control means normally occupying a first position in which it interrupts said conduit means to thereby prevent the passage of lubricant through said conduit means to the element to be lubricated, said control means being movable into a second position to thereby allow the flow of lubricant through said conduit means to the element to be lubricated, and means for admitting lubricant under pressure to said conduit means and to said piston and said control means to move said piston from its ineffective position into its effective position and to move said control means from its first position into its second position.

2. A lubricating head according to claim 1, which includes yieldable means continuously urging said lubricating piston into its ineffective position and continuously urging said control means into its first position.

3. In a lubricating head for lubricating an element of a chain drive: a cylinder provided in said lubricating head, a lubricating piston reciprocably mounted in said cylinder and movable from an ineffective position into an effective position for engagement with the element to be lubricated, conduit means communicating with said cylinder and extending through said piston for conveying lubricant therethrough to the element to be lubricated, fluid pressure operable control means reciprocably mounted within said piston and normally occupying a first position in which it interrupts said conduit means to thereby prevent the passage of lubricant from said cylinder through said conduit means to the element to be lubricated, first spring means continuously tending to hold said piston in its ineffective position, second spring means continuously tending to hold said control means in its first position, and means for admitting lubricant under pressure to said conduit means and to said piston and said control means to move said piston from its ineffective position into its effective position and to move said control means from its first position into its second position, the effective piston area of said lubricating piston acted upon by lubricant under pressure admitted thereto being greater than the area of said control means acted upon by lubricant under pressure admitted thereto to thereby cause said lubricating piston to engage the element to be lubricated prior to said control means establishing communication between said cylinder and said conduit means.

4. In a lubricating head for lubricating an element of a chain drive: a lubricating piston reciprocably mounted in said lubricating head and movable from an ineffective position into an effective position for engagement with the element to be lubricated, conduit means within said lubricating piston for conveying lubricant to the element to be lubricated, lubricant conveying means arranged in said lubricating head for conveying lubricant under pressure to said lubricating piston for moving the latter from said ineffective position into said effective position, said lubricating piston having a bore therethrough communicating with said lubricant conveying means, a metering piston reciprocably mounted in said lubricating piston and defining with a portion of said lubricating piston a lubricant receiving chamber, a control piston reciprocably mounted in said metering piston and having one end thereof in fluid communication with said bore, closure means connected to said control piston and movable by the latter into position for closing said conduit means in said lubricating piston, said metering piston including passage means communicating with said lubricant receiving chamber and with said conduit means in one position of said control piston, said control piston on movement to another position preventing communication between said passage means and said conduit means, spring means continuously urging said closure means away from its position in which it closes said conduit means, and additional spring means continuously urging said lubricating piston into its ineffective position.

5. A lubricating head according to claim 1, which includes a holding member elastically connected to said head for connection to a chain drive to be lubricated.

6. A lubricating head for lubricating an element of a chain drive comprising a housing having a connection for receiving lubricant under pressure, a lubricating member in said housing movable by pressure of said lubricant from an ineffective position to an effective position wherein it engages a member to be lubricated, said lubricating member being formed with a passageway having an inlet to admit said lubricant under pressure and an outlet for application of lubricant to said member to be lubricated, means in said passageway to convey lubricant from said inlet to said outlet, said means including pressure operated control means operable by pressure of said lubricant to admit lubricant under pressure at said inlet to said passageway to subject lubricant in said passageway to said pressure so that lubricant is conveyed to said outlet.

7. A lubricating head for lubricating an element of a chain drive comprising a housing having a connection for receiving lubricant under pressure, a lubricating piston reciprocably mounted in said housing and movable by pressure of said lubricant on one end from an ineffective position to an effective position to engage its opposite end with an element to be lubricated, first spring means engaging said lubricating piston and continuously urging the same into said ineffective position said lubricating piston being formed with a passageway having an inlet to receive said lubricant under pressure and an outlet for dispensing lubricant, means in said passageway to convey lubricant from said inlet to said outlet, said means including control means movable from a closing position closing said inlet to an opening position for admitting lubricant from said inlet to said outlet, second spring means engaging said control means and continuously urging same into said closing position, said control means being movable by pressure of said lubricant to admit said lubricant through said inlet so that pressure of said lubricant will convey lubricant to said outlet, the area of said lubricating piston acted upon by lubricant under pressure and said first spring means on one hand and the area of said control means acted upon by lubricant under pressure and said second spring means on the other hand being so dimensioned relative to each other that said lubricating piston will be movable by said lubricant under pressure to effective position before said pressure actuates said control means.

8. A lubricating head comprising a lubricating member having a chamber closed at one end and an inlet to said chamber to admit lubricant under pressure, a metering piston in said chamber movable toward and away from said closed end behind said piston, said chamber communicating at its opposite end in front of said piston with a discharge passage to dispense lubricant, said head having communicating passageways connecting said inlet to the space in said chamber behind said piston at said closed end and said space to the opposite end of said chamber in front of said piston, and a control member in its first normal position closing said passageways to communication between said inlet and said space, and establishing communication between said space and said end of said chamber in front of said piston, said control member being movable by said lubricant under pressure to a second position closing said passageways to communication between said space and said opposite end of said chamber and establishing communication between said inlet and said space.

9. The lubricating head claimed in claim 8, in which means is provided to return said control member to establish communication between said space and said chamber in front of said piston and to move said metering piston toward said closed end to force the lubricant in said space into the opposite end of said chamber in front of said piston.

10. The lubricating head as claimed in claim 8, in which an adjustable member is provided to limit the movement of the metering piston so that the amount of lubricant discharged may be varied.

11. A lubricating head comprising a lubricating member having a chamber closed at one end and an inlet to said chamber to admit lubricant under pressure, a metering piston in said chamber movable toward and away from said closed end behind said piston, said chamber communicating at its opposite end in front of said piston with a discharge passage to apply lubricant to a member to be lubricated, said metering piston having communicating passageways connecting said inlet to the space in said chamber behind said piston at said closed end and said space to the opposite end of said chamber in front of said piston, and a control member movable in said metering piston from a first position closing said passageways to communication between said inlet and said space and establishing communication between said space and the opposite end of said chamber in front of said piston, said control member being movable relative to said metering piston by lubricant under pressure admitted through said inlet to a second position closing said passageways to communication between said space and said opposite end of said chamber and establishing communication between said inlet and said space to admit lubricant under pressure to move said piston away from said closed end to discharge lubricant from the opposite end of said chamber and to fill said space with a measured quantity of said lubricant.

12. The device claimed in claim 11, in which said control member is a control piston reciprocable in said metering piston to cover and uncover ports in said passageways, and said control piston is moved by pressure of said lubricant from normal position toward said discharge passage to establish communication between said inlet and said space behind said metering piston, said lubricant under pressure moving said metering piston away from said closed end to discharge lubricant from the opposite end of said chamber.

13. The device claimed in claim 12, in which means are provided to return said control piston to establish communication between said space and said chamber in front of said metering piston, and said control piston acts subsequently to return said metering piston toward said closed end, forcing the lubricant from said space into the opposite end of said chamber in front of said piston.

14. In a lubricating head for lubricating an element of a chain drive: a lubricating piston reciprocally mounted in said lubricating head and movable from an ineffective into an effective position for engagement with the element to be lubricated, said lubricating piston having means for conveying lubricant to the element to be lubricated, fluid pressure operable control means normally occupying a first position in which it prevents operation of said means for conveying lubricant, said control means being movable into a second position to allow operation of said means for conveying lubricant, means for admitting lubricant under pressure to said piston and to said means for conveying lubricant and to said control means to move said piston from its ineffective position into its effective position and to move said control means from its first position into its second position, said lubricating piston having metering means reciprocally mounted therein for metering the quantity of lubricant conveyed to the element to be lubricated.

References Cited in the file of this patent

UNITED STATES PATENTS 2,905,270     Jackson _____ Sept. 22, 1959

FOREIGN PATENTS 238,906     Great Britain _____ Sept. 30, 1926